Aug. 28, 1934.  R. R. SEARLES  1,971,967
SPRING CONNECTION
Filed Aug. 9, 1932
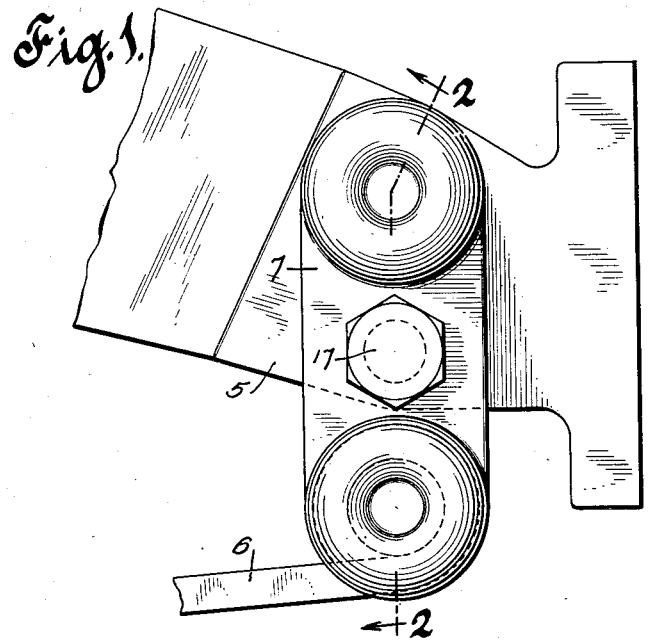
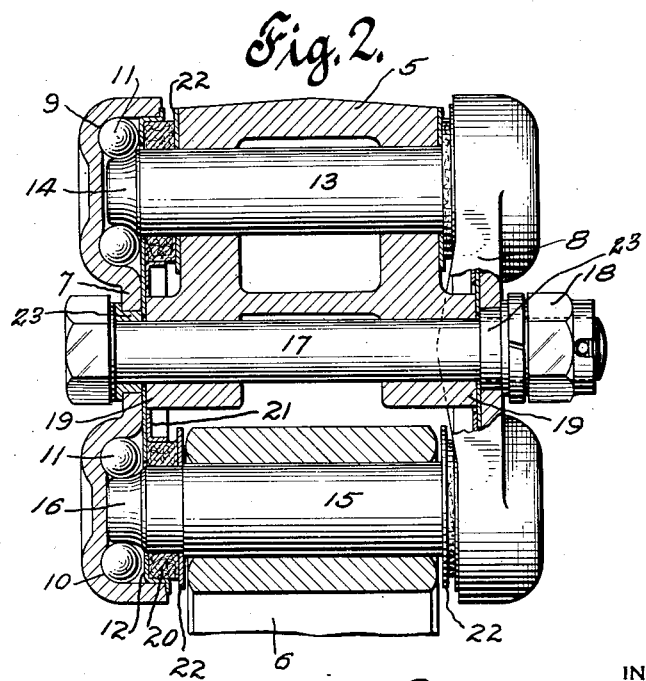
INVENTOR
Raymond R. Searles
BY
Mitchell Bechert
ATTORNEYS.

Patented Aug. 28, 1934

1,971,967

UNITED STATES PATENT OFFICE 1,971,967

SPRING CONNECTION

Raymond R. Searles, New Britain, Conn., assignor to The Fafnir Bearing Company, New Britain, Conn., a corporation of Connecticut Application August 9, 1932, Serial No. 628,054

15 Claims. (Cl. 267—54)

My invention relates to a spring connection and more particularly to a so-called hinge connection for connecting a vehicle spring to a frame.

It is the general object of my invention to provide a hinge end connection which is simple in construction, easy to assemble, and which permits of substantial economies in production and use.

Other objects and features of the invention will be hereinafter pointed out or will become apparent to those skilled in the art upon study of the specification taken in connection with the drawing.

Briefly stated, in a preferred form of the invention I employ shackle link means or connecting links for a spring and frame preferably coacting therewith through anti-friction bearing members. The connecting links may be furthermore connected to one of the connected members so as to prevent shackling movement between that member and the links while permitting a hinge movement between the other member, usually the spring, and the links. Again, in that form of my invention particularly shown in the drawing, the shackle links are so constructed that they may be reversed end for end or from side to side of the support so as to constitute, in effect, a reversible bearing bracket for the end of the vehicle frame.

In the drawing which shows, for illustrative purposes only, a single preferred form of the invention—

Fig. 1 is a side view, in elevation, of a hinge connection illustrative of the invention;

Fig. 2 is a partial sectional view taken substantially in the plane of the line 2—2 of Fig. 1.

In said drawing, 5 indicates a frame, for example an automobile frame, while 6 indicates a spring to be connected thereto. The frame and spring are connected by means of shackle or connecting links 7—8 which are preferably duplicates of each other and which may be symmetrical or substantially symmetrical. Links such as 7—8 are now well known and are usually formed of pressed metal providing raceways 9—10 at spaced apart points thereon for the reception of anti-friction bearing members such as balls 11—11. The balls, as is well known, may be held in place by spacers, or the raceways 9—10 may be substantially filled with balls so as to provide an arch holding arrangement and may be held against lateral outward displacement by any suitable means such as a sheet metal plate 12 forming a part of the dust excluding and lubricant retaining means.

The frame 5 carries means such as a through pin 13 projecting beyond the sides thereof and having a raceway 14 on each of the projecting ends. The spring 6 may carry means such as a through pin 15 projecting beyond the sides thereof and having raceways 16 complementary to the raceways 10 on the connecting links. The antifriction bearing members 11 interposed between the raceways on the links and the raceways on the pin 13—15 serve, in the present instance, to pivotally connect the spring to the links and assist in connecting the links to the frame 5.

The construction as thus far described would constitute a shackle construction permitting a shackling motion between the frame and spring. In accordance with my invention, however, the links 7—8 are rigidly secured to one of the members, such as the frame 5, by suitable means such as a through bolt 17 extending through the links preferably intermediate the ends thereof, and provided with means such as a nut 18 for drawing the links toward each other. In the form shown, the frame 5 acts as spacing means for the links 7—8 and, as illustrated, has outwardly projecting bosses 19—19 for engagement with the links, or, more strictly speaking, with the sheet metal plate 12 forming part of the dust excluding means and, in any event, serve to space the links apart when the latter are drawn up by means of the through bolt. Thus, the links are prevented from partaking of any shackling motion with respect to the frame 5, since the links are connected to the frame by means of a through bolt 17 and are prevented from rotating thereabout by means of the pin 13 and coacting balls 11.

It will be noted that the pin 13 is of a length to remain free of the links 7—8 while the pin 15 is of a length to engage and assist in spacing the links 7—8. The pin 15 is made of such predetermined length that when the links 7—8 are drawn toward each other so as to be firmly held to the frame, the links will be in engagement with or at least in position to be in engagement with the ends of the pin 15 so that the end thrust between the spring through the pin 15 will be taken directly between the latter and the shackle links and not through the balls. The balls interposed between the pin 13 and the links may be arranged together with their races so that the balls take both radial and end thrusts.

Foreign matter may be excluded from and lubricant retained on the bearing surfaces by a suitable means such as the sheet metal plate 12, heretofore noted, and felt or the like rings 20 surrounding each of the pins 13—15 and supported circumferentially by the plate 12 and an auxiliary plate 21, while the rings 20 are supported laterally by plates or washers 22 surrounding the pins 13—15.

It will be seen that the links 7—8 are rigidly carried by the frame while free pivotal movement is permitted between the spring 6 and the links. I prefer to employ shackle links 7—8, as shown, which are symmetrical so as to facilitate manufacture and speed up assembly. Links of substantially the form shown are well known as shackle links and may be produced very cheaply. It is, however, to be understood that I do not wish to be confined to such shackle links nor to a particular means for securing the links against shackling motion to the members such as the frame. Various changes and modifications may be made in that and other respects.

When standard shackle links such as 7—8 are employed, it may sometimes be difficult to secure just the proper spacing between the center line of the pin 13 and the center line of apertures in the links 7—8 for receiving the through bolt 17. I therefore prefer to provide bushings such as bronze bushings 23 in the enlarged apertures in the links. These bushings may be reamed so as to cause a proper fit between all of the parts. The bushings may in some cases be omitted, but they will usually be preferable since the links are usually heat treated and are relatively hard, and if improper spacing of the apertures in the links should occur, such defect may perhaps be best remedied by the bushings, as described.

While the invention has been described in considerable detail and a single preferred form illustrated, it is to be understood that various changes, additions and omissions may be made within the scope of the invention as defined in the appended claims.

I claim:

1. In a spring connection, a frame member, a spring member, pin means carried by each of said members and projecting beyond the sides thereof, link members cooperating with said pin means to connect said spring and frame to each other, each of said link members comprising a member having corresponding bearing raceways concentric with the projecting ends of both of said pin means, anti-friction bearing members interposed between the pin means carried by said spring and the adjacent raceways of said link members, anti-friction bearing members interposed between the projecting portions of said pin means carried by said frame and the adjacent raceways of said link members, and means for detachably securing said link members intermediate the ends thereof to hold said links against oscillation on the pin means carried by said frame.

2. In a spring connection, a frame, a spring, means for pivotally connecting said frame and spring comprising shackle links reversible end for end, and means for rigidly holding said shackle links to one of said first mentioned members to prevent shackling action between said member and said links while permitting a hinge action between the other of said members and said links.

3. In a spring connection, a frame, a spring, shackle links for pivotally connecting said frame and spring, and interchangeable anti-friction bearing members interposed between both of said first mentioned members and adjacent parts of said shackle links, and means for rigidly securing said shackle links to said first mentioned member against oscillation relatively thereto.

4. In a spring connection, a frame, a spring, pin means secured to each of said members and projecting beyond the sides thereof, said pin means having corresponding raceways for anti-friction bearing members at the projecting ends thereof, shackle link means having two sets of spaced apart similar raceways for cooperation with the raceways of said pin means, anti-friction bearing members interposed between the raceways of said shackle means and the raceways of said pin means for anti-frictionally connecting said spring and frame, and means for rigidly connecting said shackle link means to said frame against oscillation relatively thereto.

5. In a spring connection, a frame, a spring, reversible shackle links for connecting said spring and frame, said frame being of a width to act as a spacer for said links, a through bolt for connecting said links to said frame, a pin extending through said frame in spaced relation to said through bolt, anti-friction bearing members interposed between the ends of said pin and adjacent portions of said shackle links, and means for pivotally connecting said spring to said shackle links.

6. In a spring connection, a frame, a spring, each of said members carrying pivot pin means projecting beyond the sides thereof, shackle links for connecting said spring and frame, the pin means carried by the spring being of a length to act as spacing means for said links, anti-friction bearing members interposed between the last mentioned pin means and adjacent portions of said links, and means for rigidly connecting said links to the frame to check oscillation of said link relatively thereto.

7. In a spring connection, a frame, a spring, pin means carried by said spring, pin means carried by said frame, connecting links for said spring and frame, anti-friction bearing members interposed between the pin means carried by the spring and adjacent portions of said connecting links, the last mentioned pin means being longer than the other pin means to act as a spacer for the adjacent portions of said connecting links, and means for rigidly connecting said connecting links to said frame to check oscillation of said links relatively thereto.

8. In a spring connection, a frame, a spring, pin means carried by said frame and extending beyond the sides thereof, pin means carried by said spring and extending beyond the sides thereof, connecting links for said spring and frame and having corresponding raceways for anti-friction bearing members at spaced points adjacent the projecting ends of said pin means, anti-friction bearing members interposed between said raceways and said pin means, said pin means on said spring being of a length to engage and space the adjacent portions of said connecting links, said pin means on said frame being free of said connecting links, other portions of said links being held in spaced relation by said frame, and a through bolt extending through said links and frame intermediate the ends of said links for rigidly securing said links to said frame against oscillation relatively thereto.

9. In a spring connection, a frame, a spring, reversible connecting links for connecting said frame and spring, means for connecting said links and frame at spaced apart points, one of said means comprising a through bolt extending through said links and frame, and bushings interposed between said through bolt and said links, and means for pivotally connecting said spring to said connecting links.

10. In a spring connection, a frame, a spring, means for pivotally connecting said spring and frame to each other, including connecting links reversible end for end, and means intermediate the ends of said links for connecting the latter to one of said two first mentioned members for the purpose of preventing pivotal motion between said links and said member while permitting pivotal motion between the other of said members and said links.

11. In a spring connection, a frame, a spring, pin means carried by said spring and projecting beyond the sides thereof, pin means carried by said frame and projecting beyond the sides thereof, connecting links for said spring and frame comprising substantially symmetrical reversible links, corresponding anti-friction bearing member raceways at spaced points thereon to cooperate with the projecting ends of said pin means, anti-friction bearing members interposed between said raceways and the projecting ends of said pin means, and means for connecting said links to one of said members to prevent shackling motion between the latter and said links.

12. In a spring connection, a frame, a spring, reversible shackle links for connecting said spring and frame, means for pivotally connecting one of said members to said connecting links, means extending through said links for connecting the same to each other and to the other of said two first mentioned members, and means spaced from said through means and connected to said frame and acting between said links for preventing rotation between said links and frame.

13. In a spring connection, a frame, a spring, reversible links for said frame and spring, a through bolt for connecting said frame and links, and projecting means carried by said frame and spaced from said through bolt and coacting with said links for preventing oscillation of the latter on said through bolt, and means for pivotally connecting said spring to said links.

14. In a spring connection, a frame, a spring, said frame having oppositely located integral bosses thereon facing outwardly, connecting links engaging said outwardly facing bosses so as to space said links apart, means for connecting said links to said frame, means for pivotally connecting said spring to said links, and means held between said bosses and said links for excluding dust from and retaining lubricant in said pivotal connection.

15. A vehicle frame bracket for hingedly supporting one end of a load carrying vehicle spring comprising, two link members, a hinge bearing at each end of each of said members, and means to hold both of said members rigidly against movement on opposite sides of a supporting portion of said vehicle frame with one hinge bearing of each link member projecting from said supporting portion to receive between them the ends of a load carrying vehicle spring hinge pin, both of said link members being reversible end for end.

RAYMOND R. SEARLES.